US011644307B2

(12) United States Patent
Gotusso et al.

(10) Patent No.: US 11,644,307 B2
(45) Date of Patent: May 9, 2023

(54) METHOD AND TERMINAL FOR GENERATING AN INDEX OF COMPATIBILITY BETWEEN TWO ENDS OF TWO TUBES, AND TUBE PROVIDED WITH AN ANGULAR MARKING

(71) Applicant: VALLOUREC TUBES FRANCE, Meudon (FR)

(72) Inventors: Nicolas Gotusso, Boulogne-Billancourt (FR); Mélanie Armand, Boulogne-Billancourt (FR)

(73) Assignee: VALLOUREC TUBES FRANCE, Meudon (FR)

( * ) Notice: Subject to any disclaimer, the term of this patent is extended or adjusted under 35 U.S.C. 154(b) by 0 days.

(21) Appl. No.: 17/612,095

(22) PCT Filed: May 20, 2020

(86) PCT No.: PCT/FR2020/050844
§ 371 (c)(1),
(2) Date: Nov. 17, 2021

(87) PCT Pub. No.: WO2020/234546
PCT Pub. Date: Nov. 26, 2020

(65) Prior Publication Data
US 2022/0214166 A1 Jul. 7, 2022

(30) Foreign Application Priority Data

May 20, 2019 (FR) ...................................... 1905272

(51) Int. Cl.
*G01B 21/20* (2006.01)
*G01B 21/10* (2006.01)
(Continued)

(52) U.S. Cl.
CPC ............. *G01B 21/20* (2013.01); *G01B 21/10* (2013.01); *G01B 21/24* (2013.01); *F16L 13/02* (2013.01)

(58) Field of Classification Search
CPC ........ G01B 21/20; G01B 21/10; G01B 21/24; G01B 11/08; G01B 11/12; G01B 11/24;
(Continued)

(56) References Cited

U.S. PATENT DOCUMENTS 7,325,326 B1    2/2008 Istre et al.
8,966,984 B2 *  3/2015 Lesage ................. G01N 29/225
                                                        73/622

(Continued)

OTHER PUBLICATIONS

International Search Report dated Oct. 5, 2020 in PCT/FR2020/050844 filed May 20, 2020, 2 pages.

(Continued)

*Primary Examiner* — Yaritza Guadalupe-McCall
(74) *Attorney, Agent, or Firm* — Oblon, McClelland, Maier & Neustadt, L.L.P.

(57) ABSTRACT

Method for generating a compatibility index between two ends of two tubes, in particular before welding operations, the method comprising the steps of: (a) marking an angular reference (M0) on each of the two ends, (b) orbital measurement of an inside radius of each of the ends; (c) determining an index of angular compatibility ($IND_{\vec{theta k}}$) between the two ends for an angular deviation ($\Theta$, theta) between the angular references of the ends, said angular compatibility index deriving from a maximum difference between the inside radii of each opposite end, (d) iterating the step of determining the angular compatibility index for several values for angular deviation between the angular references of the ends; (e) generating an overall score for compatibility (Hk) between said two ends, the overall com- (Continued)

Figure 1:
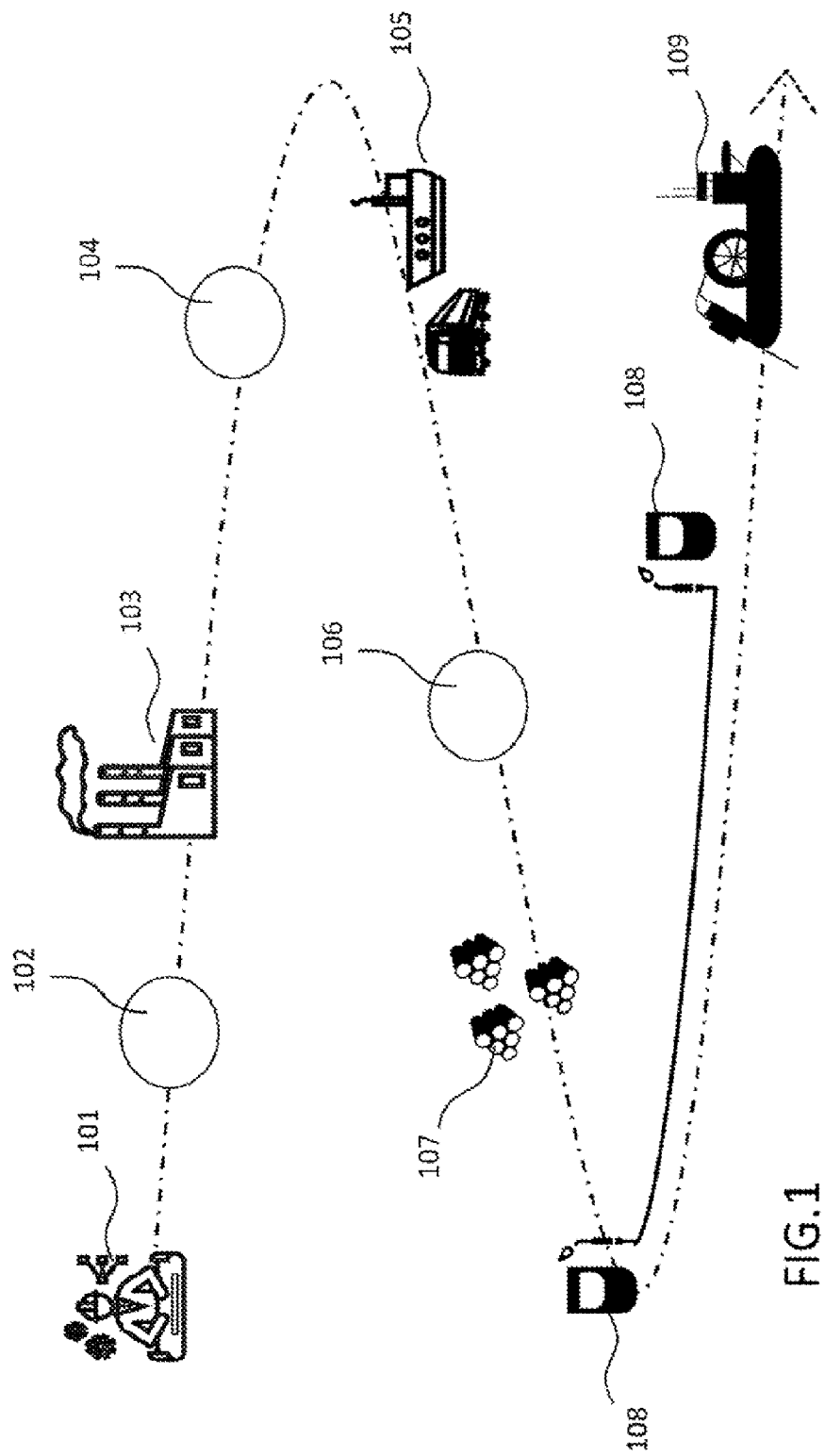

patibility score being a function of the angular compatibility indices determined for several angular deviation values.

23 Claims, 12 Drawing Sheets

(51) Int. Cl.
*G01B 21/24* (2006.01)
*F16L 13/02* (2006.01)

(58) Field of Classification Search
CPC .. G01B 11/06; F16L 13/02; F16L 9/00; B23K 37/00
See application file for complete search history.

(56) References Cited

U.S. PATENT DOCUMENTS

| | | | |
|---|---|---|---|
| 9,074,881 B2* | 7/2015 | Hees | E21B 19/16 |
| 9,400,162 B2* | 7/2016 | Moreau | G01B 5/12 |
| 10,215,011 B2* | 2/2019 | Trillon | G01N 29/04 |
| 10,641,737 B2* | 5/2020 | Michel | G01N 29/04 |
| 10,690,633 B2* | 6/2020 | Noel | G01N 29/30 |
| 10,710,163 B2* | 7/2020 | Silveira E Silva | B23Q 17/24 |
| 11,073,377 B2* | 7/2021 | Hepburn | C03B 23/0476 |
| 11,519,880 B2* | 12/2022 | Lazzari | G01N 29/275 |
| 2011/0079584 A1 | 4/2011 | Hees | |
| 2017/0276260 A1* | 9/2017 | Bonel | F16L 13/02 |
| 2018/0264556 A1 | 9/2018 | Silveira E Silva et al. | |
| 2022/0214166 A1* | 7/2022 | Gotusso | G01B 11/24 |

OTHER PUBLICATIONS

Preliminary French Search Report dated Feb. 5, 2020 in French Patent Application No. 1905272 filed May 20, 2019, (with Translation of Category), 3 pages.

* cited by examiner

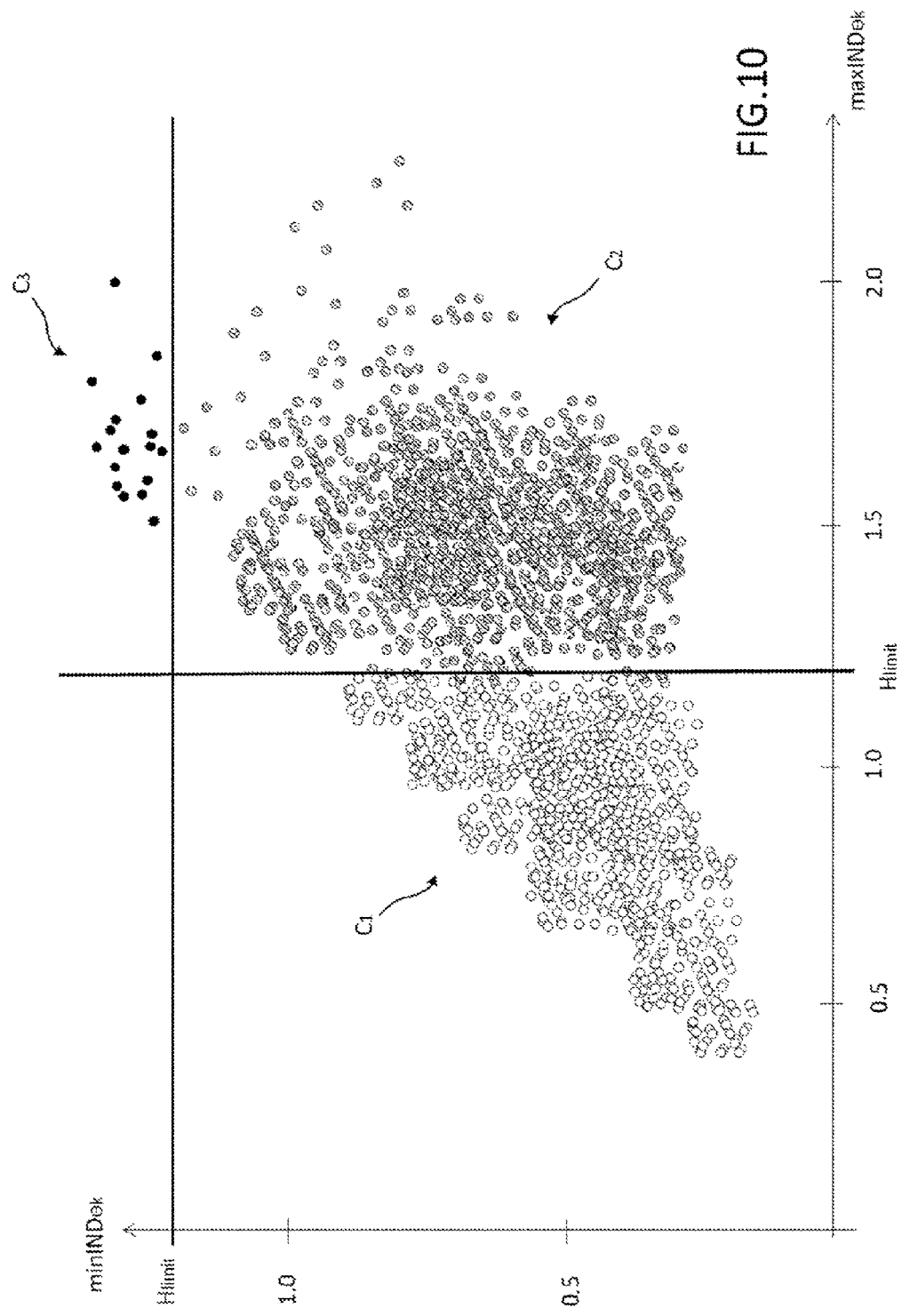

| N° | C1 (%) | C2 (%) | C3 (%) |
|---|---|---|---|
| 10110 | NA | 24.20 | 75.80 |
| 10252 | 24.58 | 69.04 | 6.38 |
| 10508 | 7.13 | 81.80 | 11.07 |
| 10162 | NA | 27.95 | 72.05 |
| 10472 | NA | 11.07 | 88.93 |
| 10232 | 11.07 | 84.24 | 4.69 |
| Tn | 52 | 33 | 15 |

FIG.11

METHOD AND TERMINAL FOR GENERATING AN INDEX OF COMPATIBILITY BETWEEN TWO ENDS OF TWO TUBES, AND TUBE PROVIDED WITH AN ANGULAR MARKING

The field of the invention concerns the field of methods for ensuring good production of joints between tubular elements such as pipelines, in particular intended to convey hydrocarbons or petroleum industry derivatives thereof. More particularly, the field of the invention relates to methods which take into account the geometry at the ends of said tubular elements in order to organize their assembling. The field of the invention also concerns systems for carrying out such methods and the tubular elements themselves.

The assembling of pipelines or tubular elements made of steel which are several meters long, for example intended for carrying hydrocarbons or derivatives thereof, requires particular treatment at their end in order to join them in a leaktight fashion by welding. This joining is carried out on the site where these pipelines will be installed or assembled (reeling). The tubular elements assembled together must be particularly leaktight and must withstand high mechanical stresses. With a view to this secure assembling, the junctions produced between the various tubular elements require a prior step of checking the geometry of the distal ends of these tubular elements. Sometimes, shape machining is necessary in order to allow assembling by welding. The welding of the ends also requires machining of a specific chamfer in order to carry out the welding. The quality and the reliability of the welding carried out depends to a large part on the ends of the tubes placed facing one another.

Currently, there are means for measuring the geometrical properties of the ends of the tubular elements. These means may use various techniques which are more or less precise and more or less practical to use. They make it possible in particular to anticipate the conditions of positioning the tubular elements opposite one another in order to propose a configurational optimum for the subsequent welding.

It will be understood that compatibility between two tubular elements is required in particular with regard to the maneuvers necessary for defining a functional alignment during the welding operation. A slight misalignment is not necessarily critical, and there are operational margins for carrying out the welding of the elements. These deviations are also known as a hi-lo measurement in the technical literature of the field of the invention. Standards established by the manufacturers prescribe tolerance for a given external diameter and for given wall thicknesses.

For example, document U.S. Pat. No. 9,074,881 describes a system for measuring geometrical properties at the end of the tubular elements, these measurements being carried out on ends already having a chamfer machined with a view to subsequent welding. The measurement is then carried out just before the welding in order to determine the conditions of opposite positioning and alignment of the two tubular elements to be welded. These measurements make it possible to determine the movements to be imparted to the free tubular element, while minimizing an axial distance between the two tubes to be welded and minimizing the differences between internal and respectively external diameters (hi-lo) of these two ends.

Depending on the measurement, either the tubes may be brought together before being welded, or it is necessary to correct the relative positions. This correction may require rotation of the free tubular element relative to the one already in place. Each time the position is corrected, it is necessary to repeat the measurements in order to analyze whether this new position allows adequate welding.

One drawback of such a system is that, in the event of an inadequate measurement, there is a processing time necessary for carrying out this optimization, which reduces the rate at which the welding is carried out and with which the extension of the pipeline is carried out. In the worst cases, there is no rotation which makes it possible to predictively ensure adequate welding between two tubular elements, and it is then necessary to remove the free tubular element from the production line. It is then necessary to carry out a repair by treatment of the geometry of its end, whether by shaping or full machining, or quarantining if no immediate treatment allows it to be adapted. At this very late stage, however, on pipeline assembling sites it is very expensive to have to waste time on an incompatible tubular element, and the running costs of the structures do not tolerate a reduction of the production turnovers.

These operations are time-consuming and expensive. They require qualified personnel and complicated operations for these very heavy tubular elements with large dimensions.

Document WO2009126023 describes a welding method which modifies the parameters of the welding in order to compensate for the geometrical differences between the ends of two tubular elements which are intended to be assembled. Configuring of the welding device is carried out while taking into account the geometry of the tubular ends and in particular of the machined part. This technique requires configuring on a case-by-case basis of two tubular elements which are intended to be assembled, and complicates the welding program by increasing the time required for the welding.

Documents U.S. Pat. No. 6,273,320 and US2017276260 disclose two methods for aligning tubes, during which measurements of the geometries of the chamfered ends of these two tubular elements are made in order to carry out maneuvers on said elements, such as rotations, in order to identify the best configuration.

A method for determining a relationship for the sequencing and ordering of tubular elements after one another in order to form an optimal pipe is also known from U.S. Pat. No. 7,325,326. For each new tubular element associated with the pipe, the method teaches following of the ordering plan. The ordering plan is constructed by seeking the best tubular element to be presented next, this best tubular element being sought from among the group of tubular elements remaining to be associated with this pipe. The best tubular element that can be associated with the pipe will according to this document be the one for which there is an angular presentation position of the tubular element with respect to the tubular element of the pipe being formed, for which position the sum of the measurement differences to the second power is the least (Lowest Sum of EXPR(N)) with respect to the values calculated for all the other tubular elements remaining to be associated. The measurements considered are the distances between an axis of rotation of a measurement apparatus and points on the internal or external surface of the tubular element in question. This method for seeking the best element gives no information about the overall compatibility between two ends of two tubes.

There is, however, a need to reduce the number of interventions to be carried out in order to adapt the end of a tubular element on site and to reduce the rates of incompatibility between tubular elements which have nevertheless been preselected. There is also a need to anticipate the risks of mutual incompatibility of the tubes. There is also a need to facilitate the formation of the pipe during operation and to save time and increase quality for each weld carried out. There is likewise a need to simplify the management of the tubular elements arranged in quarantine, which requires creation of storage spaces and specific handling for carrying out subsequent compatibility improvement operations.

There is a need to overcome the aforementioned drawbacks.

For this purpose, the invention relates to a method for generating an index of compatibility between two ends of two tubes, in particular before welding operations, said method comprising the steps of:

marking an angular reference ($M_0$) on each of the two ends;

orbitally measuring a characteristic relating to the profile of each of the ends;

determining an index ($IND_{thetak}$) of angular compatibility between the two ends for an angular deviation ($\Theta$, theta) between the angular references of said ends, this angular compatibility index being derived from a difference maximum between the orbital measurements, this maximum being sought for facing places of the profile, iterating the determination of the angular compatibility index for a plurality of values of angular deviation between the angular references of said ends;

generating an overall score (Hk) of compatibility between these two ends, the overall compatibility score being a function of the angular compatibility indexes determined for a plurality of angular deviation values.

Advantageously, the orbital measurement of a characteristic relating to the profile may according to the invention be a radius measurement. In particular, the orbital measurement may be a radius measurement, determined relative to a virtual center (Cv), for which the radius differences are minimal. This correction makes it possible to determine a center at the necessarily imperfect end. This is because the tubes according to the invention come from a demanding industrial manufacturing procedure, and even if the aim is to provide ends which are perfectly circular and have a constant radial thickness, the real situation of the tubes produced tolerates a certain variation. Advantageously, when the radius measurement is an internal radius measurement, the virtual center may be determined as a function of the internal radii.

As an alternative or in addition, the radius measurement may also or equally be an external radius measurement. In this case, the orbital measurement may be an external radius measurement determined relative to a virtual center, which will itself have been obtained as a function of the internal radii by searching for a virtual center such that the differences between these internal radii are minimal.

Advantageously, the orbital measurement is carried out according to the same clock convention relative to the angular reference, so that for a given angular deviation ($\Theta$, theta) between the angular references of the two tubes, for each measurement angle (($\varphi$), also denoted "phi", the difference calculation between the value of the orbital measurement at this measurement angle on a first tube and the value of the orbital measurement observed on the second tube at an angle which is the inverse of this measurement angle is iterated, this inverse angle ($360°$-$\varphi$), 360-phi, corresponding to $360°$ minus the value of the measurement angle (($\varphi$), phi, so that after these iterations, the iteration for which the difference of orbital measurements of the two facing ends is maximal as well as the value of this maximum difference corresponding to the difference maximum between the orbital measurements for this angular deviation ($\Theta$, theta), may be identified.

Preferably, step (d) may be carried out for angular deviation values increasing successively by a step of less than $5°$, and preferably with a step of $1°$, between each angular deviation. Preferably, the first angular deviation value may be zero and the last may be $359°$. There may for example be 359 iterations in step (d) in addition to the determination of step (c), i.e. 360 angular compatibility index determinations for 360 possible values of angular deviation between the angular references of said ends. Specifically, for tubes with longitudinal welds, and in order to take into account an assembling constraint associated with the place of the weld, it is conceivable to carry out this iteration only for an angular arc of the order of $270°$ centered on the place of the longitudinal weld.

According to the method according to the invention, the overall score (Hk) of compatibility between the two ends takes a discrete score among:

compatible (c), or compatible on condition of controlled angular presentation (cc), or alternatively incompatible (nc).

For example, the overall compatibility score (Hk) may depend on a HiLo threshold (Hlimit) defined as a maximum tolerance threshold for all the angular compatibility indexes ($IND_{thetak}$) between the two ends which are determined for each angular deviation ($\Theta$, theta). In addition, the overall compatibility score (Hk) may also depend on the threshold range angular size (S) for which there is a continuous group of angular deviation values ($\Theta$, theta) in which the angular compatibility indexes ($IND_{thetak}$) are less than the HiLo threshold (Hlimit).

In this case, the overall compatibility score may take into account the development of the scores successively obtained during the iteration of the determination of the angular compatibility index for successive angular deviation values between the angular references of said ends.

Consequently, when the overall score (Hk) of compatibility between two ends takes the discrete score "compatible (c)", all the angular compatibility indexes (INDthetak) measured for each of the angular deviations may be less than the HiLo threshold (Hlimit). Likewise, when the overall score (Hk) of compatibility between two ends takes the discrete score "compatible on condition of controlled angular presentation (cc)", there may be at least one range (P1) of which the angular size is greater than said threshold range. The larger this range is, the more it is statistically possible that when carrying out the welding step there are no or only very few rotational movements to be imparted to the free tubular element. More specifically, the range may be also characterized by a curve representing the development of the angular compatibility indexes ($IND_{thetak}$) as a function of the development of the angular deviation ($\Theta$, theta). For example, a range may be acceptable if the corresponding portion of the development curve does not have an inflection with a radius of curvature less than a threshold.

In particular, a continuous group may be a group of values of angular deviations ($\Theta$, theta) considered successively in the iteration step of determining the angular compatibility index. Furthermore, for example, when the overall score (Hk) of compatibility between two ends takes the discrete score "compatible on condition of controlled angular presentation (cc)", the method may comprise a step (f) of marking an allowable zone (Za) on one of the two ends in order to angularly locate, relative to the angular marking ($M_O$), a range (P1) of which the angular size is greater than the threshold range and in which there is a continuous group of angular deviation values (⊖, theta) in which the angular compatibility indexes ($IND_{thetak}$) are less than the HiLo threshold (Hlimit).

The invention also makes it possible to carry out a method for generating a compatibility statistic (% Tn, % $N_{Tn}$) in a group of n tubes for which an overall compatibility score has been determined according to the method according to the invention for generating an index of compatibility between two ends of two tubes, for each of the possible pairs of ends of the group of n tubes, such that the following are defined for each end:

its proportion (a, e) of compatibility "C1" with all the ends of the other tubes its proportion (b, f) of partial compatibility "C2" with all the ends of the other tubes on condition of a controlled angular presentation between the ends, and its proportion (c, g) of incompatibility "C3" with all the ends of the other tubes, these three proportions making up 100% and together representing the compatibility statistic of each tube within a group.

Preferably, for each tube (Tn), a compatibility statistic (% Tn) may be assigned for this tube, corresponding to the proportions obtained by one of its two ends having the greatest proportion of incompatibility.

One of the benefits of the invention is that it provides a method for dividing n tubes, such that the tubes are distributed into at least two batches as a function of the compatibility statistics of each of the tubes, such that each batch comprises an equivalent number of tubes having a proportion of incompatibility C3 less than a compatibility threshold.

During the division of a group of n tubes, the operator may for example carry out a step of marking the tubes, during which a compatibility marking ($M_C$) is written on at least certain tubes, the marking ($M_C$) comprising information generated on the basis of the method according to the invention, and in particular the marking may make it possible to identify the tubes having a proportion of incompatibility C3 greater than said compatibility threshold.

The invention furthermore relates to a tube having an angular marking ($M_O$) at each of its distal ends, the angular marking making it possible to carry out the method according to the invention.

The invention also relates to an electronic terminal having an interface for reading an identifier of a tube, an interface for receiving orbital-measurement data of a characteristic relating to the profile of an end of this tube; a calculator for transforming the orbital measurements as a function of a virtual center of said end, said calculator being configured to generate an overall score of compatibility of a pairing of tubes according to the method of the invention.

The invention also relates to an assembly composed of such an electronic terminal and a group of n tubes, each having an angular marking ($M_O$) at each of their distal ends, each distal end of each tube having 2*(n−1) overall scores (Hk) of compatibility with each of the distal ends of the (n−1) other tubes of the group, these overall compatibility scores being obtained by carrying out the method according to the invention, the overall scores of compatibility of each of the tube ends with the ends of other tubes of the group being stored in the electronic terminal.

More particularly, the angular location, relative to the angular marking ($M_O$), of a range of which the angular size may be greater than the threshold range, and in which there is a continuous group of angular deviation values (⊖, theta) in which the angular compatibility indexes ($IND_{thetak}$) are less than the HiLo threshold (Hlimit), is stored in the electronic terminal for each of the 2*n*(n−1) possible combinations between these n tubes.

Lastly, the invention furthermore relates to a computer program product having a calculator and a memory for carrying out the steps of the method according to the invention.

Figure 2:
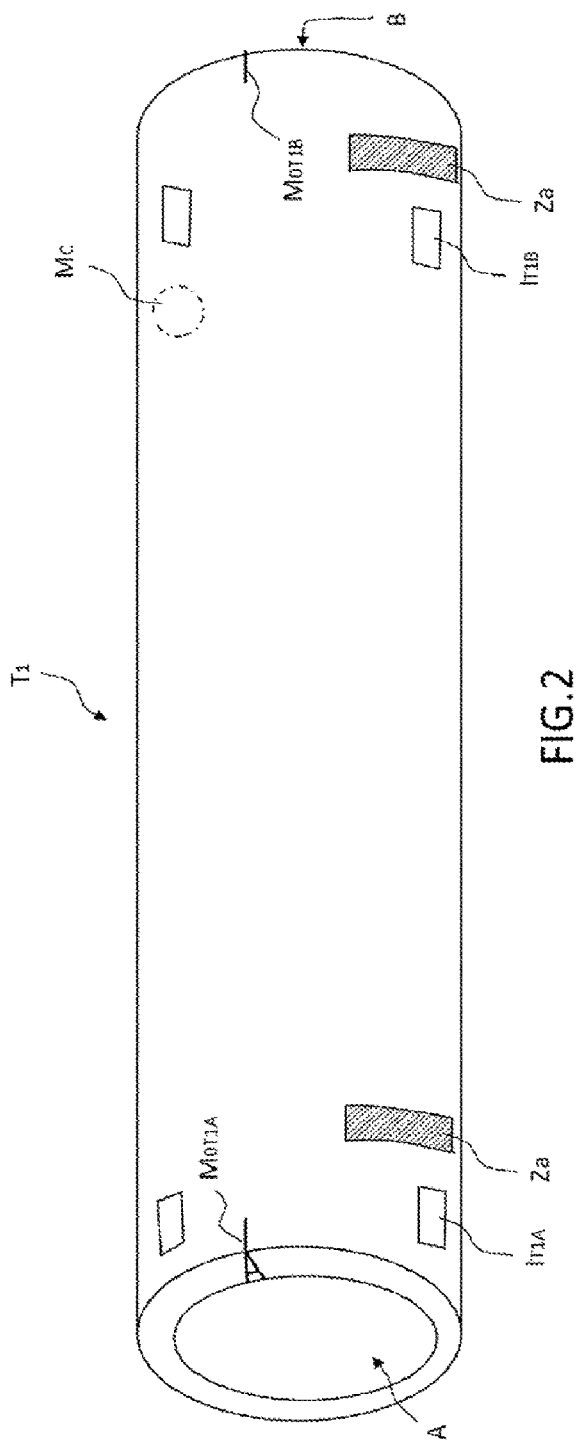
Figure 3:
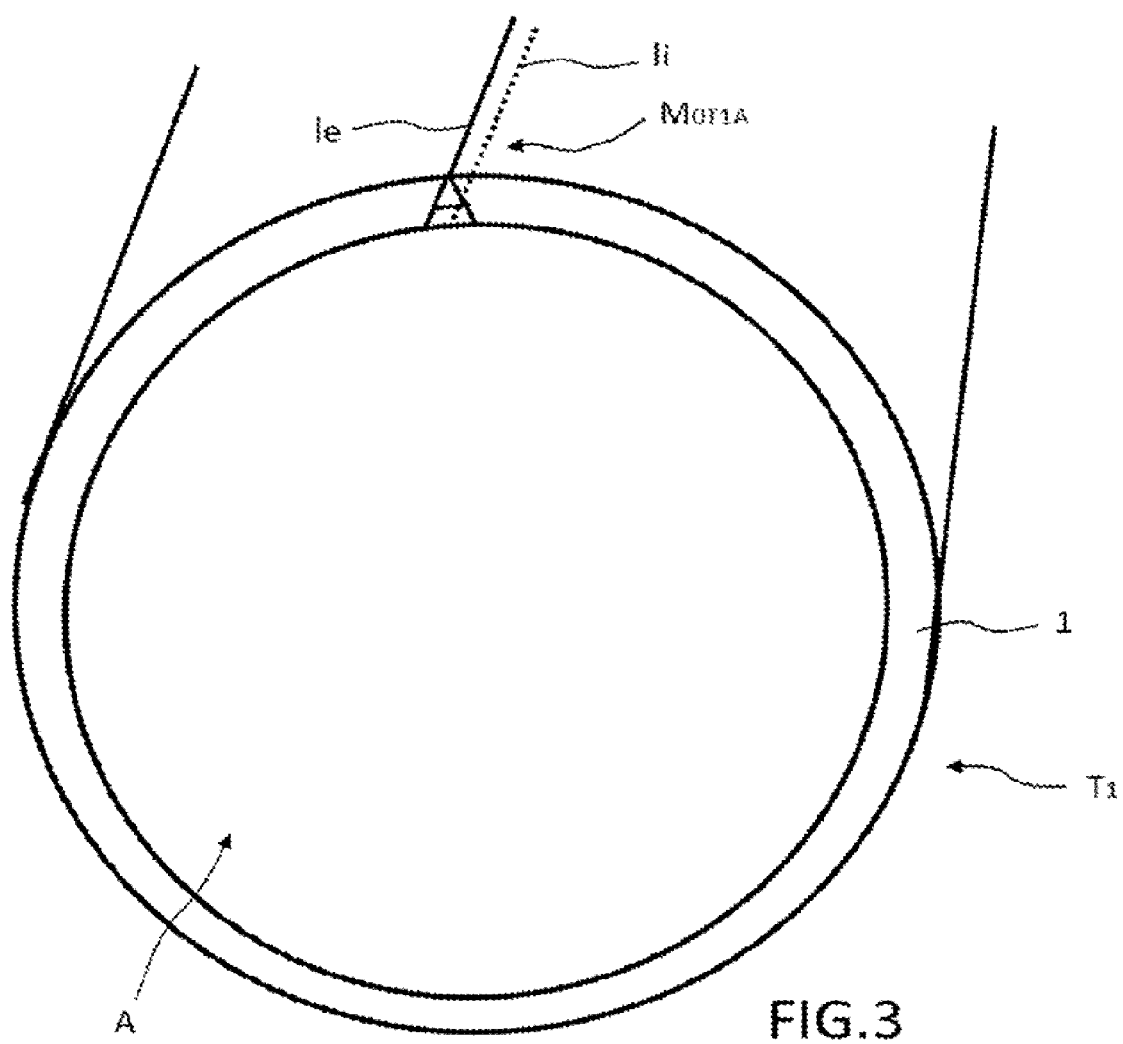
Figure 4:
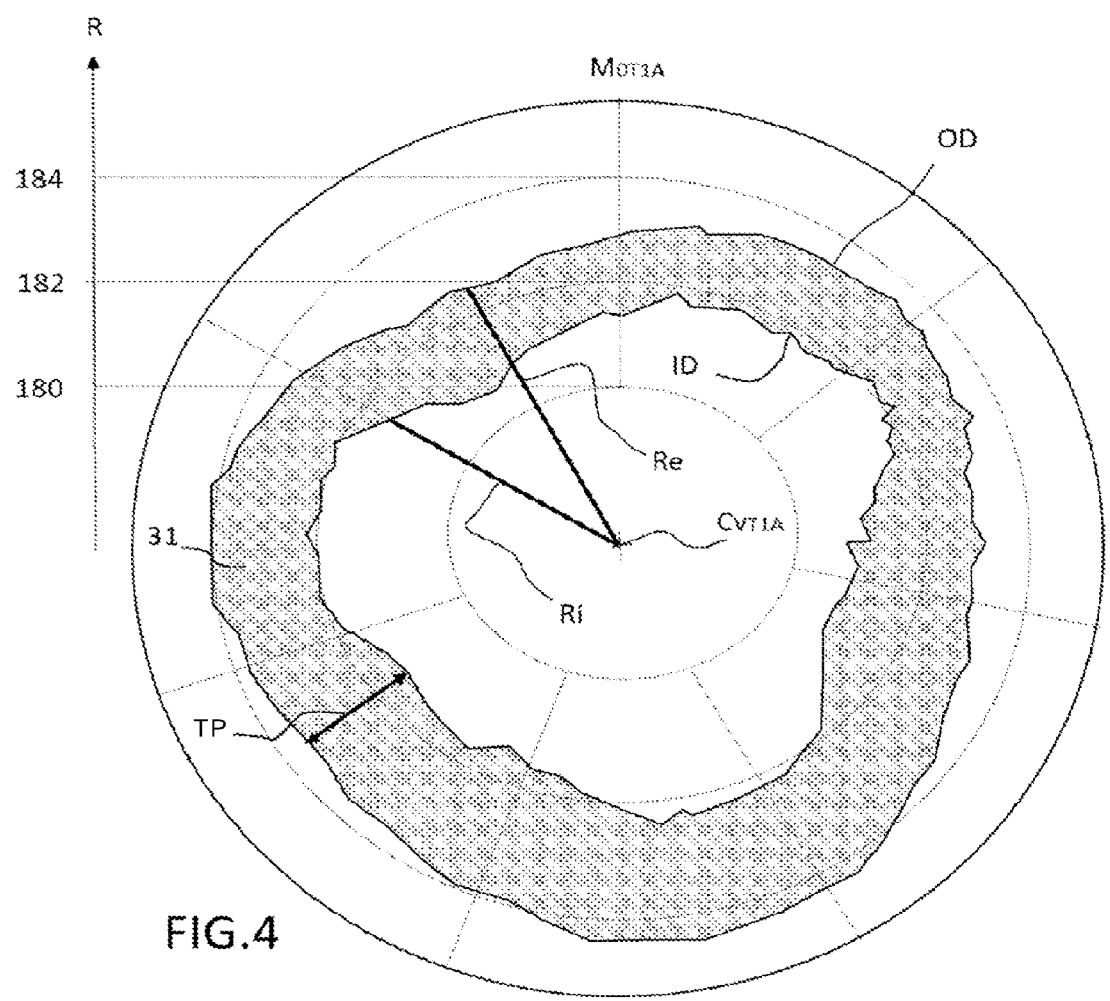
Figure 5:
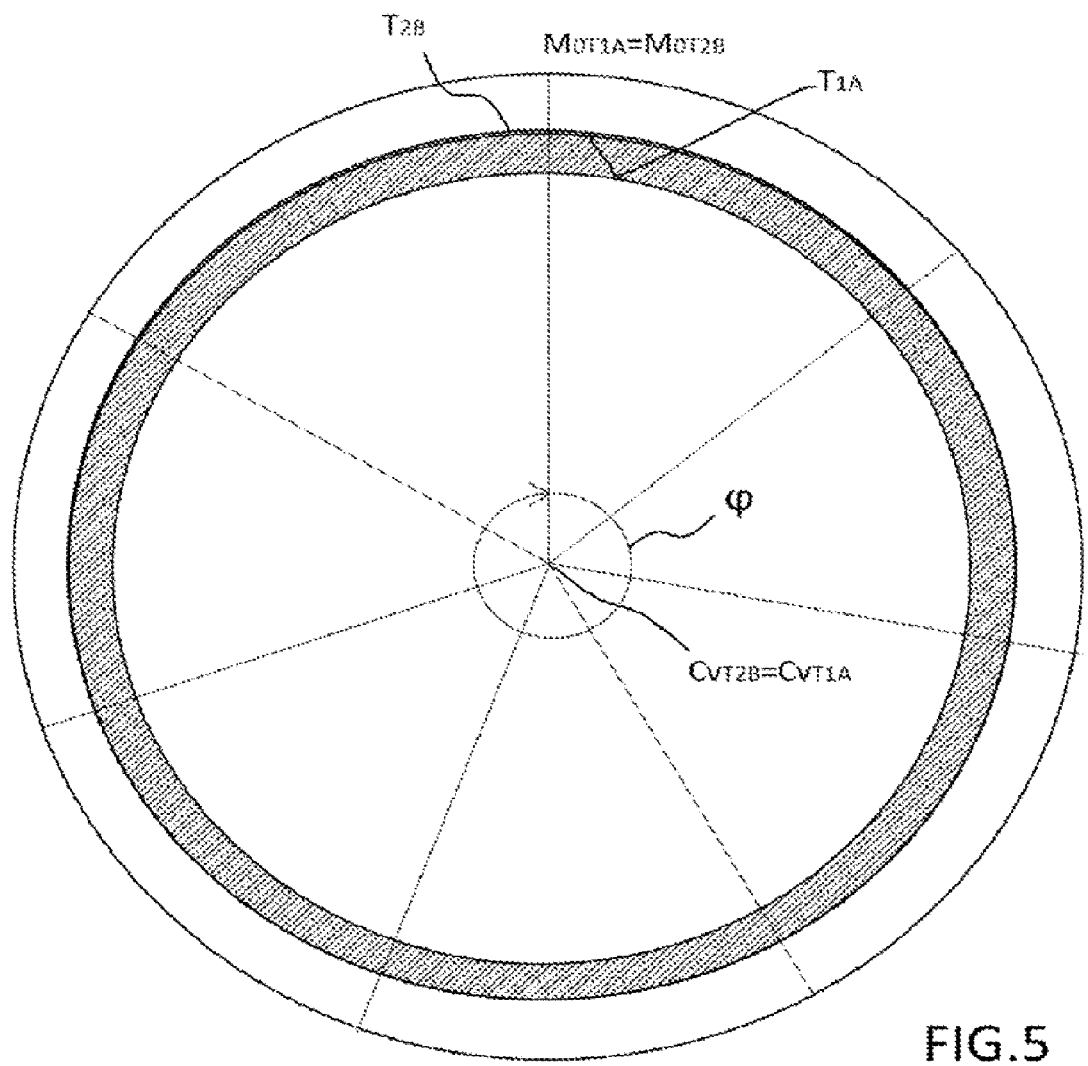
Figure 6:
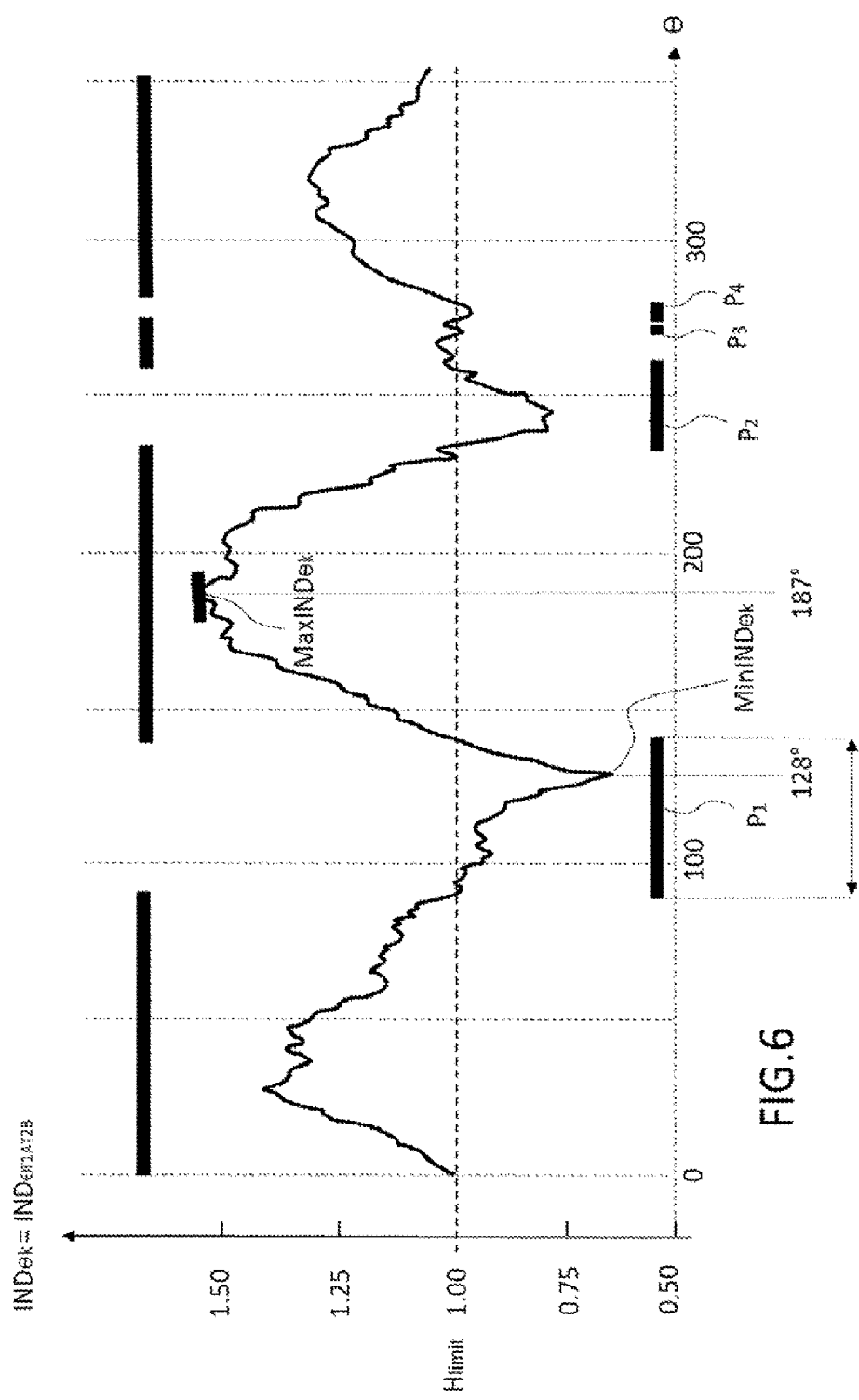
Figure 7A:
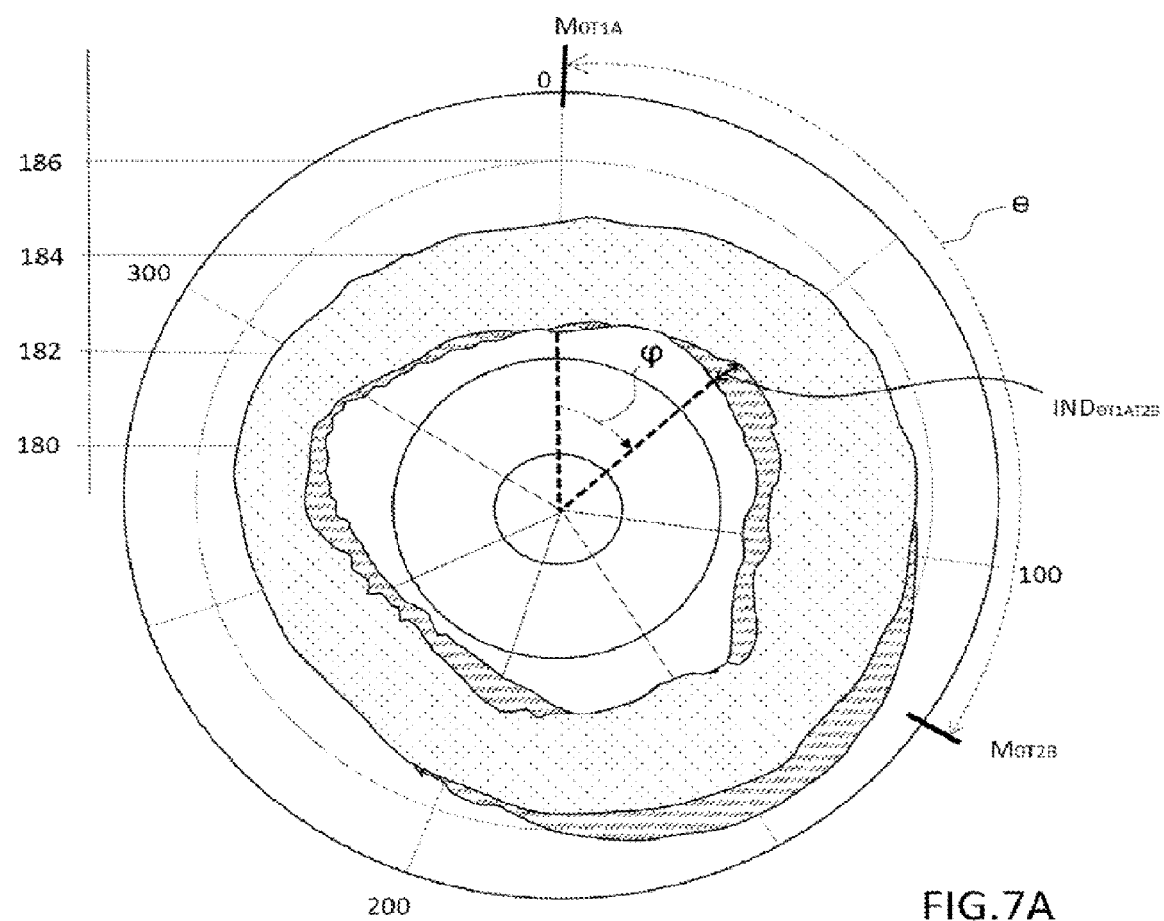
Figure 7B:
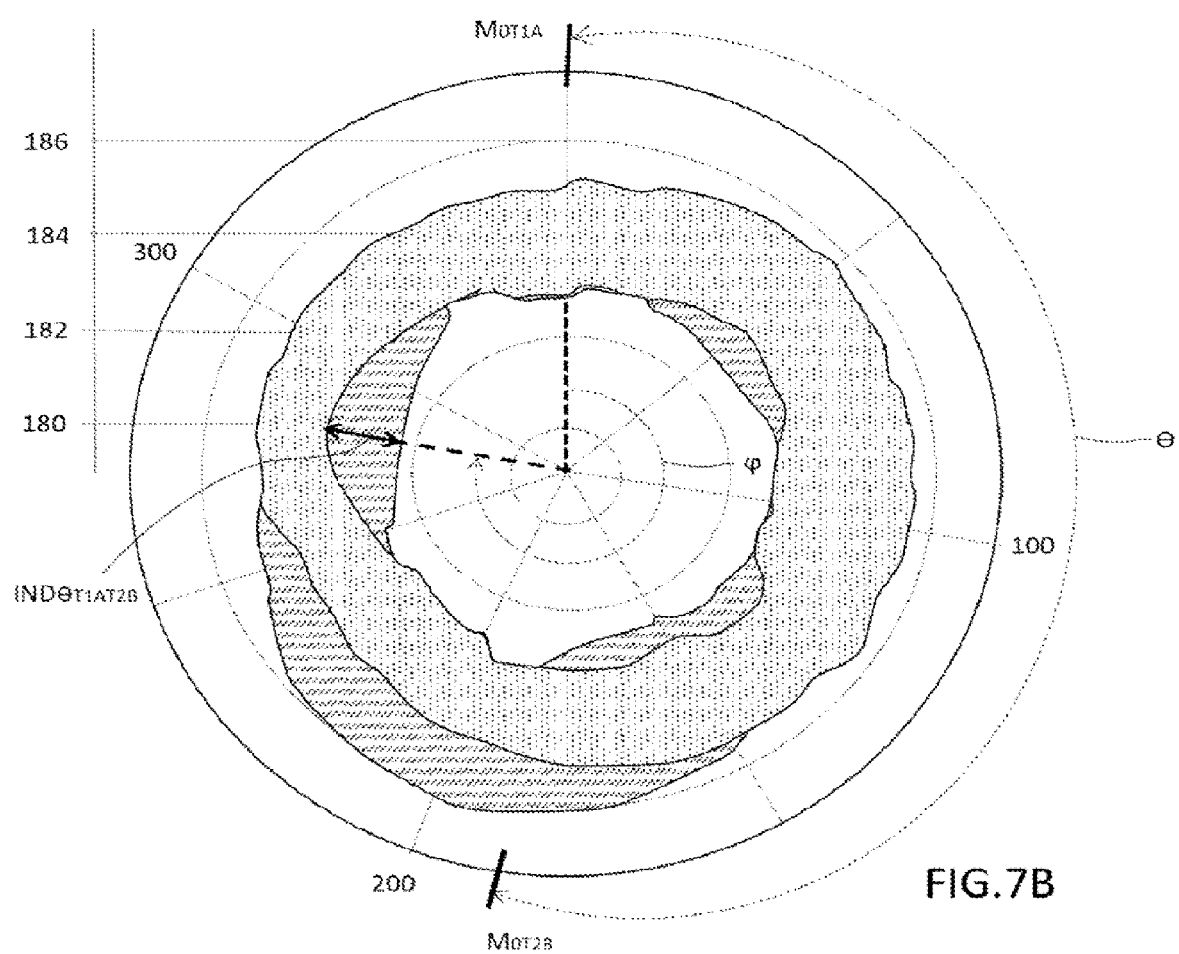
Figure 8:
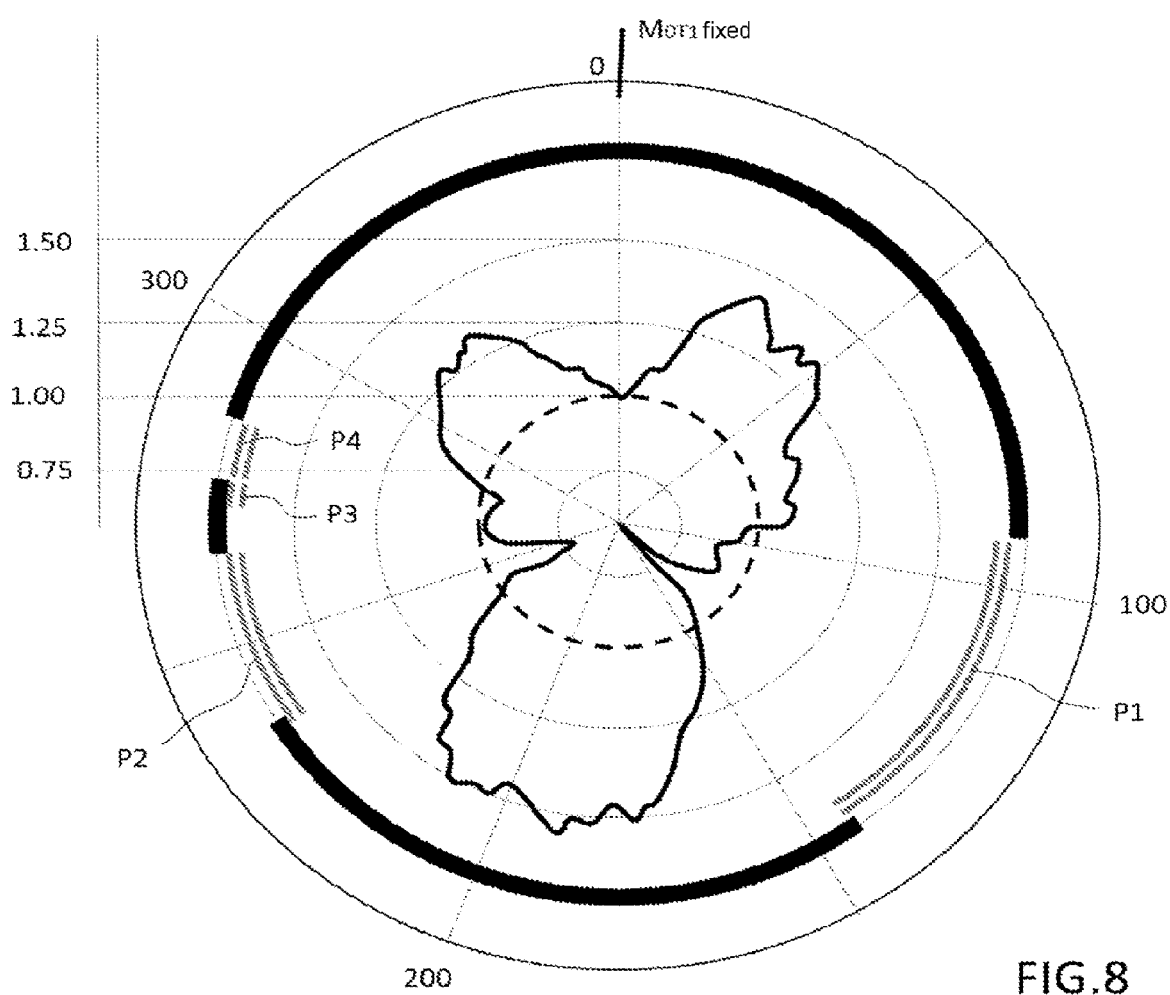

Other characteristics and advantages of the invention will emerge from the following detailed description with reference to the appended drawings, which illustrate:

FIG. 1: the various steps of conveying a tube, or group of tubes, from its design to its installation on site;

FIG. 2: an external view of a tube according to the invention;

FIG. 3: a perspective front view of an end of the tube according to the invention;

FIG. 4: a detail view of an end profile of an end of a tube, on a scale which is enlarged in order to improve the visibility of the internal and external radius variabilities for the entire circumference of said end, the variability being observed with an accuracy of 6 mm when the radius values represented are between 180 mm and 186 mm in said representation;

FIG. 5: an example of superposition between an end A of a tube T1 and an end B of a tube T2, in which the angular deviation ⊖, theta, between the respective angular references $M_{OT1A}$ and $M_{OT2B}$ is 0°;

FIG. 6: a first graphical representation of an angular compatibility index $IND_{⊖k}$, also denoted $IND_{thetak}$, in the example in which k=T1AT2B, obtained except for one embodiment of the method according to the invention;

FIG. 7A: a detail view of an end profile of an end A of a tube T1 positioned opposite an end B of a tube T2, on an enlarged scale, with an optimal angular deviation between the respective angular references of these ends;

FIG. 7B: a view similar to FIG. 7A with an angular deviation between the respective angular references of these ends such that the presentation of these ends is not adequate;

FIG. 8: a schematic representation of the places of the adequate angular ranges for the end A of the tube T1, when this end is intended to be positioned opposite the end B of a tube T2;

FIG. 9A and

Figure 9A:
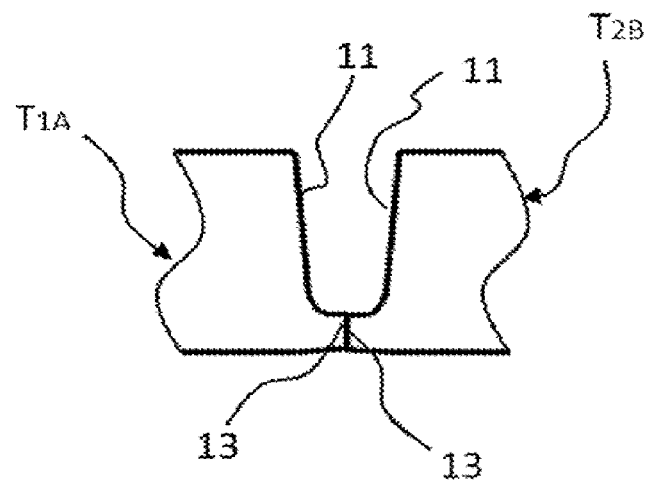
Figure 9B:
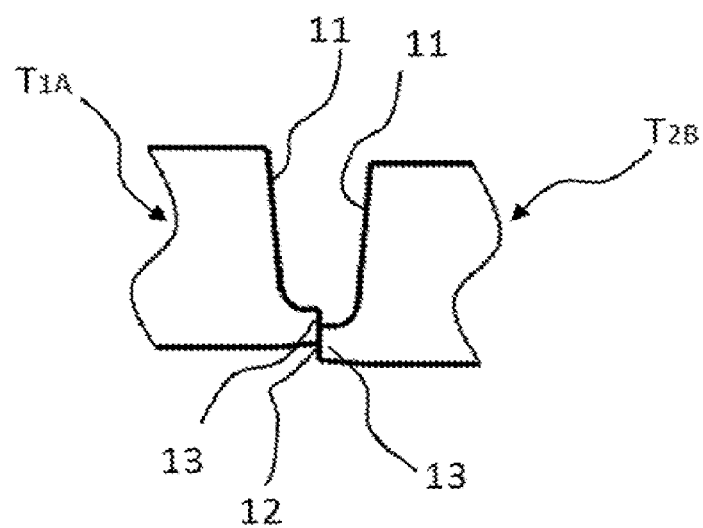

FIG. 9B: views in schematic cross section of chamfers formed at the opposing ends of two tubes FIG. 10: an example of classification of pairings of tubes which is obtained on the basis of one embodiment of the method of the invention, FIG. 11: an example of a table recording the compatibility statistics of tubes of a group of tubes, the compatibility statistics being obtained on the basis of one embodiment of the method of the invention.

In the rest of the description, a tube designates a tubular element or a pipeline with large dimensions, in particular several meters in length, and with a substantially circular cross section. For example, this tube is intended to be used to convey a raw material such as a hydrocarbon. The tube is preferably made of steel and it is intended to be assembled with other similar tubes by welding. The steel tubes to which the invention applies in particular may be tubes without welding or tubes obtained from a shaped sheet, the longitudinal edges of which are longitudinally welded.

In order to optimize the welding, it is preferable to have a large overlap of the ends of the tubes placed opposite. In the present description, a first tube T1 to be welded to a second tube T2 will be considered.

The petroleum industry sets specifications and acceptability thresholds in terms of overlap deviation between two ends of tubes when these ends are arranged opposite one another. In the technical field of the invention, and more particularly of pipeline installation, the term "HiLo" specification is used. This "HiLo" specification may designate acceptability criteria in terms of a deviation between the internal diameters or radii of one tube relative to a second tube. This "HiLo" specification may also relate to acceptability criteria in terms of deviation between the external diameters or radii of this tube relative to the second tube. Lastly, this "HiLo" specification may also relate to acceptability criteria in terms of overlap area between the ends of two tubes with respect to one another.

The HiLo values measured are dependent on the respective positions of the tubes with respect to one another. With an increment of 1 degree per rotation of the first tube relative to the second tube, there are then 360 presentation configurations of these two tubes with respect to one another. For each of these configurations, the HiLo criterion may be checked, whether in terms of internal radius and/or external radius, and/or degree of overlap between the end surfaces of the two tubes.

Tolerance thresholds may be set for each of these criteria. The manufacturing tolerances of the tubes intended to form pipelines are given particularly in the API 5L standards.

In the present description, an end profile of a tube comprises data describing the actual internal and external circumference of the latter. It may also be termed a cross-sectional profile or a radius profile.

FIG. 1 represents the main steps of conveying a tube 1 from its design to its installation on a given site.

The steps of design 101 and predictive design 102 make it possible to define the main technical characteristics of a tube, including in particular the geometrical and structural characteristics. The geometrical data may, for example comprise: the length, the internal diameter, the external diameter or also the thickness of said tubes. The structural data may comprise data of material, finishing, mechanical strength, stress response or data of heat treatments, surface treatment or data relating to a longitudinal weld. Furthermore, this step makes it possible to define a set of data of the life cycle of the tube, such as its factory identifier, the manufacturer identifier or also its destination site for its installation, etc.

The invention makes it possible, at this design step, to set data relating to the tolerance margins of the radius values calculated over the circumference of the end cross sections of the tubes. A datum describing the HiLo specification may also be defined.

The predictive design step 102 makes it possible, for example, to define a preparation strategy of the tubes according to the characteristics of the tubes which are defined in the design step 101. The preparation step may, for example, be a step of shaping the ends in order to improve the circularity.

FIG. 1 comprises a step 103 defining the step during which the tubes are manufactured or finalized or repaired. Typically, certain steps of preassembling (for example such as tubes assembled according to pipe-in-pipe technology), surface treatment or finishing of the tubes (for example by adding an external coating, and/or an internal coating resistant to corrosion CRA) may be carried out in this step. Furthermore, this step may correspond to operations of preparing or treating the ends of the tubes 1, such as operations of shaping (for example by upsetting or forging) and/or machining with a view to softening the internal and/or external profiles of the ends of the tubes.

A step 104 represents a step during which data are collected from each of the tubes T1, T2, . . . Tn produced. Measurements of physical quantities are carried out on the tubes. These measurements relate in particular to the geometry of the ends of the tubes. Certain data collected during this step 104 may, for example, be encoded on a support. This encoded support may, for example, take the form of a two-dimensional information code with juxtaposed elementary geometrical figures, generally white and black squares, or also a numerical code of the QR code or Flash code type. Depending on the embodiments, the information supports may be passive or active.

Preferably, according to the invention, an information support I specific to each end of each tube is created. There will be, for example, as represented in FIG. 2, information supports $I_{T1A}$ and $I_{T1B}$, respectively, at each of the ends A and B of a tube T1. For example, there may be three information supports equally distributed at each end. This information support I is, for example, adhesively bonded to the surface of the tube, particularly in proximity to the end in question. The information support I may also be engraved.

In particular, the information support I may also comprise, in addition to the data collected in step 104, data relating to the specificities of the manufacturing step 103.

As represented in FIG. 1, the group of tubes manufactured in step 103 will necessarily undergo a step 105 of transport to a storage facility 107, from which facility they will either undergo transport 105 again and/or immediately undergo a step 108 of butt welding in order to form a long pipe.

In FIG. 1, the data collection step 104 is carried out before the transport 105. While remaining within the scope of the invention, however, the transport 105 may also take place before the data collection 104. This data collection 104 may also be carried out after the tubes have been brought to their storage facility 107. The data collection step 104 is necessarily carried out before the welding step 108.

At the time of the data collection 104, for each end of the tube and before the data collection starts, a reference marking $M_0$ is produced at each of the ends of the tubes. The reference $M_0$ is an angular reference. The reference $M_0$ makes it possible in particular to set a frame of reference for the measurements carried out respectively at the circumference of each end of the tube.

FIG. 3 represents the reference $M_{T10A}$ of the end A of a tube T1. It may in particular be marked by a line machined on the internal perimeter of the tube and also a line machined on the external perimeter. Advantageously, the reference $M_0$ may also be engraved on the transverse face 11 of the end of the tube, and may for example take the form of an alphabetic letter engraved on this front face. In the example represented, the engraved letter is the letter A. The internal line "li" and the external line "le" define a plane intersecting the letter formed on the transverse face 11 of this end. This plane may also pass through the longitudinal axis of the tube T1.

In order to collect the data, a convention is in particular defined in order to select a unique sense of rotation for all the measurements which will be taken for each of the tubes on the basis of the angular references $M_0$ of each of the ends, respectively. The sense of rotation selected for collecting the measurements is clockwise, although it may as an alternative be counterclockwise.

Once the data have been collected and written into an information support I affixed on the tube, the various operators in charge until a pipeline is used in situ, the final step 105, or at the very least until the welding step 108, can access the data stored on these information supports I. Just before the welding step 108, the operators may access two types of information for each end of the tube, on the one hand the place of the reference marking $M_0$ and on the other hand the data contained in the information support.

Step 108 corresponds to assembling the tubes, for example by an operation of one-to-one welding of their respective ends. The term welding operation broadly covers all the steps carried out in order to make the welding possible, namely and not exhaustively the alignment of the tubes, the preparation of a chamfer at their end, their clamping and opposite positioning, and lastly the welding steps per se. This step precedes their operational installation 109, for example on the bed of an ocean. This last step 109 is represented in FIG. 1.

FIG. 1 mentions a step 106 of processing the data collected in the collection step 104. The data processing step 106 comprises statistical simulations are carried out in order to evaluate the mutual compatibility of the tubes of a group of tubes produced in step 103 and subjected to the measurements of step 104. Advantageously, the data processing step 106 may be carried out during the transport step 105. Advantageously, the data processing of step 106 is completed before the start of the welding step 108.

In step 104, a group of n tubes Tn is considered. Each tube Tn has two ends A and B. The tube Tn therefore comprises two references $M_0$ at each of its ends, respectively $M_{0TnA}$ and $M_{0TnB}$.

The measurements of step 104 may be carried out on the basis of a laser for measuring the geometrical characteristics over the extreme cross section of a tube, such as the radius values calculated at a plurality of points of the circumference. The data collected are orbital measurements of a characteristic relating to the profile of the end.

Other techniques may be employed in conjunction with the method of the invention in order to obtain a set of values characterizing the cross-sectional profile of a tube end, internal radius, external radius, thickness . . . .

According to one preferred embodiment, internal radii are measured by means of a measurement tool, for example a laser measurement tool, arranged on an axis of rotation inside the tube. A plurality of radius measurements are carried out for different positions around this axis of rotation. The measurements are orbital. Since the axis supporting the measurement device is not necessarily centered inside the tube, these measurements obtained relative to this axis of rotation may have disparities.

At the end of the measurement step 104, functions $f_{RiTnA}$ representing the internal radii measured with the measurement tool with the angle $\varphi$, phi, of rotation as a variable, in the present case according to a rotation in the clockwise sense relative to the reference $M_{0TnA}$ are obtained. Optionally, a function $f_{ReTnA}$ represents the external radii also obtained during this measurement step 104.

The data processing step 106 comprises conversion of the functions $f_{RiTnA}$ and $f_{ReTnA}$ into recentered functions $g_{RiTnA}$ and $g_{ReTnA}$. The recentered functions correspond to internal and respectively external radius values recalculated for any angle $\varphi$, phi, of rotation relative to $M_{0TnA}$ as a function of the virtual center $Cv_{TnA}$. In particular, the functions $g_{RiTnA}$ and $g_{ReTnA}$ may be the subject of the information encoded in the information supports created and affixed at the end TnA of the tube Tn. In a similar way, the information supports will be created with the data of the functions $g_{RiTnB}$ and $g_{ReTnB}$ of this tube Tn for its second end B.

The data processing step 106 requires determination of the virtual centers Cv of each end of each tube. A convention will be selected so that the virtual centers are all defined in the same way within a group of tubes. In one embodiment of the invention, the virtual centers are defined relative to the internal radius measurements.

The determination of the virtual centers uses an iterative optimization algorithm. At the first iteration, a fictitious first center Oi and an expected radius R are determined in a two-dimensional plane. Each measurement obtained in step 104 is converted into radius values Ri relative to this fictitious first center Oi. At this first iteration, a difference of each value of radii Ri and that of the expected radius R are measured. The iterations will seek to minimize these differences. The method of least squares may be used iteratively until a virtual center Cv is determined by an optimization function which minimizes the deviations between the various internal radii measured and a specified average internal radius, this specified average internal radius corresponding to an expected substantially circular cross section of the end in question. The virtual center Cv may correspond to a center obtained after a plurality of iterations and corresponding to the iteration giving the least deviation between the various internal radii recalculated relative to this virtual center Cv. In the invention, a maximum deviation threshold between the recalculated radii of 0.05 mm is defined, after which the iteration is stopped. Within this threshold, the fictitious center in question is sufficiently accurate to constitute a virtual center for the needs of the invention.

When the virtual center has been defined, the data of this new center are used to obtain the recentered functions $g_{RiTnA}$ and $g_{ReTnA}$ representing all the new values of recentered radii.

A tube $T_n$, comprises two ends, respectively A and B, and a specific virtual center may be defined for each of them. A virtual center $Cv_{TnA}$ on the side of end A and a virtual center $Cv_{TnB}$ on the side of end B. The tube $T_n$, comprises a main extent axis. The points $Cv_{TnA}$ and $Cv_{TnB}$ are not necessarily aligned on this axis, given the manufacturing tolerances of the tubes, in particular those intended to form pipelines.

FIG. 4 represents an example of the geometry of an end A of a tube $T_1$. This representation obtained during the data processing step 106 makes it possible to consider the values of internal radius, of the external radius and therefore of the radial thickness profile over the entire circumference of this end. It will be understood with this enlarged view that the internal radius Ri may vary all along the circumference within a tolerance margin of between 180 cm and 182.5 cm, and that the external radius Re varies between 183 and 185 cm.

When the radii are represented on the scale of the tubes, where two end profiles are superimposed, FIG. 5, it seems that there is little deviation between profiles of two ends of tubes, although the micro-variations observed in FIG. 4 may have important consequences at the time of welding, and they risk leading to inadequate welds.

There is therefore a need to produce an index of angular compatibility between the oppositely presented tube ends.

In the data processing step 106, the method according to the invention produces inter alia an angular compatibility index $IND_{thetak}$ which has the purpose of better anticipating the compatibility of the tubes to be assembled during the welding step, and thus to improve the quality of the joints produced for use on an installation site 109.

According to various embodiments of the invention, the angular compatibility index $IND_{thetak}$ generated may be of different types.

Preferably, this angular compatibility index $IND_{thetak}$ is generated during a data processing step 106. This step 106 of processing data may be carried out during a step of transport 105 and/or storage 107. For the data processing, a group of tubes is identified. This group of tubes is determined after the step 103 of manufacturing, and/or finishing and/or repair. This group of tubes comprises n tubes. Since each tube has two ends, the number of possible combinations between these tubes is 2*n*(n−1). A compatibility index $IND_{thetak}$ is determined for each of the 2*n*(n−1) assembling combinations. This compatibility index $IND_{thetak}$ is bilateral and related respectively to specific ends located respectively on two different tubes. K is a variable representing the set of combinations between ends of tubes of a tube group in question.

For a group of 100 tubes, this represents 19800 possible combinations. Lastly, even when considering a given pair of two tubes for which the intention is to determine a compatibility index $IND_{thetak}$, where k represents a specific pair, for example that of the end A of the tube T1 with the end B of the tube T2, in which case k=T1AT2B, there are still a multitude of ways of angularly presenting these two tube ends with respect to one another. An angle $\ominus$ represents the angular deviation between the respective angular references of the ends of the two tubes.

For example, the compatibility index $IND_{thetak}$ will be calculated on the basis of the data of internal radii which are given by the recentered functions $g_{RiT1A}$ and $g_{RiT2B}$ established previously. The index $IND_{thetak}$ may then be calculated as follows, for a given value $\ominus$, theta, of deviation between the angular references $M_{0T1A}$ and $M_{0T2B}$, in order to determine the maximum deviation observed over the entire circumference of the tubes, between the oppositely presented internal radii, when the end A of a tube T1 is presented opposite the end B of the tube T2. Since the measurements have all been made according to the same clock convention of rotation with respect to the frame of reference Mo, it is therefore necessary to reverse the reading of the data represented at one of the ends relative to those which are provided by the other end, and this is the reason why for each value $\varphi$, phi, read from one of the functions $g_{RiT1A}$, the value at (360°-$\varphi$), 360-phi, of the function $g_{RiT2B}$ is considered. It will be understood in the present description that the consideration of a pairing of tubes is independent of a permutation of one or other of the tubes in question in the processing algorithm:

$$IND\ominus k = INDi\ominus k = Max|gRiT1A(\varphi) - gRiT2B(360-\varphi+\ominus)| \text{ such that } \varphi \in [1;360°]$$

As a variant, this indicator $IND_{thetak}$ may measure the differences of external radii, in which case this index will be read alternatively as follows $$IND\ominus k = INDe\ominus k = Max|gReT1A(\varphi) - gReT2B(360-\varphi+\ominus)| \text{ such that } \varphi \in [1;360°]$$

As a variant, this indicator $IND_{thetak}$ may measure the thickness profile differences, a thickness profile TP being the difference between external radii and internal radii for any angle of $\varphi$, phi, when taking the measurements, in which case the index will also alternatively be read as follows $$IND\ominus k = INDPE\ominus k = Max|gReT1A(\varphi) - gRiT1A(\varphi) - (gReT2B(360-\varphi+\ominus) - gReT2B(360-\varphi+\ominus))| \text{ such that } \varphi \in [1;360°]$$

An internal compatibility index $INDi_{thetak}$, an external compatibility index $INDe_{thetak}$ and also a thickness profile compatibility index $IND_{TPthetak}$ may then respectively be mentioned. By representing the maximum of an absolute value, this compatibility index $IND_{thetak}$ thus defines the worst value which may be observed between the two tubes.

The compatibility index $IND_{thetak}$ will then be calculated for a plurality of values of this angular deviation $\ominus$, theta, between the reference marks M0 of each of the two tubes. For example, if an increment and a position accuracy of to within one degree between the two ends of the two tubes are taken, this gives 360 values for the angular deviation $\ominus$, theta. This compatibility index will pass through a minimum $minIND_{thetak}$ and a maximum $maxIND_{thetak}$.

FIG. 6 represents a graphical view of the values of this compatibility index $IND_{thetak}$ for a plurality of angular deviation values $\ominus$, theta, lying between 0 and 360°. FIG. 6 represents a case in which the tube $T_{1A}$ is compatible with the tube $T_{2B}$ on condition of an angular rotation. Specifically, as may be seen, there are numerous angular positions in which the compatibility index $IND_{\ominus T1AT2B}$, also denoted $ND_{thetaT1AT2B}$, is greater than the threshold $H_{limit}$.

An overall compatibility score $H_{T1AT2B}$ will be given to a given pair "k" T1AT2B. For example, this overall score $H_k$ may take a discrete score among a finite number of scores. In the example below, the overall score $H_k$ can take 3 scores:

compatible
compatible on condition of controlled angular presentation
incompatible This overall score $H_k$ will be determined as a function of the values of the compatibility index $IND_{thetak}$ which is calculated for various values of $\ominus$, theta. This overall score $H_k$ may be given on the basis of one or more of the indicators of internal compatibility $INDi_{thetak}$, external compatibility index $INDe_{thetak}$ and/or thickness profile compatibility index $IND_{TPthetak}$.

For example, the overall score $H_k$ may be given as a function of the only internal compatibility index $INDi_{thetak}$.

If the compatibility index $IND_{thetak}$ has a value less than a threshold $H_{limit}$ irrespective of the angular deviation $\ominus$, theta, the pair in question will be assumed to be 100% compatible regardless of the way in which these two ends are angularly presented with respect to one another at the time of the welding steps. The threshold $H_{limit}$ may be termed a HiLo threshold. It will therefore not be necessary to carry out angular positioning of these two ends with respect to one another before the welding step 108.

If the compatibility index $IND_{thetak}$ has a value greater than said threshold $H_{limit}$ for certain values of the angular deviation $\ominus$, theta, the size of the angular ranges of the value $\ominus$, theta, for which the compatibility index $IND_{thetak}$ has a value less than said threshold $H_{limit}$ will be considered. Specifically, for this pair there may be one or more ranges of the angular deviation $\ominus$, theta, for which the compatibility index $IND_{thetak}$ has a value less than a threshold $H_{limit}$.

In the example of FIG. 6, there are 4 angular ranges, respectively P1, P2, P3 and P4, for which the end A of the tube T1 is compatible with the end B of the tube T2. The other orientation values do not make it possible to comply with the HiLo specification. In particular, the four angular ranges cover the angular sectors of the angle $\varphi$, phi, from 90° to 130°, from 230° to 260°, from 270° to 275° and from 280° to 290° for which the assembling of the two tubes $T_1$, $T_2$ would comply with the HiLo specification. The diagram of FIG. 6 makes it possible to assess the threshold $H_{limit}$ designating the HiLo specification directly on the ordinate axis. In FIG. 6, the minimum $minIND_{thetak}$ is observed at 128° and the maximum $maxIND_{thetak}$ is observed at 187°.

The largest range of this angular deviation $\ominus$, theta, which satisfies the condition above is then considered. If this largest range is greater than a threshold range size S, the pair will be considered to be compatible on condition of controlled angular presentation.

In particular, in the example of FIG. 6, the angular extent of the range P1 is the range with the greatest extent among the 4 ranges P1 to P4. Furthermore, this range P1 is greater than the threshold range S. For example, a threshold range value is 30°. This end pair T1A-T2B is therefore considered to be compatible on condition of controlled angular presentation.

Conversely, if this largest range is less than a threshold range size S, the pair will be considered to be incompatible.

A pair will also be considered to be incompatible if, whatever the angular deviation $\Theta$, theta, in question, the compatibility index $IND_{thetak}$ has a value greater than said HiLo threshold $H_{limit}$.

The scores assigned to the pairs depend on the values selected for the criteria of HiLo threshold $H_{limit}$ and of threshold range S.

FIG. 6 makes it possible to locate the optimal angular position between the angular references $M_{OT1A}$ and $M_{OT2B}$ for which the compatibility index $IND_{thetaT1AT2B}$ reaches a minimum. In the case in point, for the angular deviation of 128° in the example of FIG. 6. FIG. 7A is a representation according to a presentation of these ends according to this optimal angular deviation $\Theta$, theta. The configuration of FIG. 7B represents the study case of FIG. 6 for which the compatibility index $IND_{thetaT1AT2B}$ reaches a maximum, namely for an angular deviation value $\Theta$, theta, of 187°. In FIG. 7A, it may be seen that the compatibility index $IND_{thetaT1AT2B}$ relating to an internal radius difference maximum was measured for a value of the angle $\varphi$, phi, relative to the angular reference $M_{OT1A}$ of 50°. In FIG. 7B, it may be seen that the compatibility index $IND_{thetaT1AT2B}$ was measured for a value of the angle $\varphi$, phi, relative to the angular reference $M_{OT1A}$ of 280°.

The HiLo thresholds $H_{limit}$ and the size of the threshold range S influence the $2*n*(n-1)$ scores of the group of n tubes. The method according to the invention is iterated in order to score all the possible combinations of pairs of tubes. The aim of the data processing step 106 is to score each of the statistically possible pairs. This scoring is carried out by matrix treatment of all the data.

Just before the welding step 108 begins, the line operator who has a fixed tube $T_{fixed}$ that has just been added to a pipe considers the first mobile tube $T_{1mobile}$ of their stock which they will be able to bring opposite the fixed tube $T_{fixed}$. Before authorizing the introduction of this first mobile tube $T_{1mobile}$ into the production and welding line, the operator will read the information supports of the ends which are intended to be placed opposite. In order to read the information supports I, the operator is in possession of an electronic terminal, for example such as a tablet, a smartphone or a computer of the PC type. Advantageously, this terminal is wireless. In order to facilitate the reading of the data contained in the information support, optics are included in this terminal in order to make it possible to scan the information support.

The operator will then subject this information to an operating system. In practice, according to one example, the terminal is capable of establishing a connection to said remote operating server so as to generate a request to a database of said operating system in order to obtain the specific information relating to the specific scanned pair, for example Tfixed-T1mobile. According to another embodiment, the terminal comprises a memory in which the data are recorded locally. This memory may be removable from the terminal.

This database contains the data associated with all the possible pairs between the ends of this group of tubes. The information transmitted to the terminal will comprise in particular the indications of whether this pair Tfixed-T1mobile is compatible or "c" or compatible on condition of controlled angular presentation or "cc", or alternatively incompatible or "nc".

Specifically, the operating system made available to the operator contains all the scores obtained by each of the ends of tubes, as well as the angular ranges of compatibility of each of these ends with all the other ends of the tube group.

If the first tube $T_{1mobile}$ is compatible, the operator will send it as it is to the welding step 108.

If the first tube $T_{1mobile}$ is indicated as compatible on condition of controlled angular presentation, the operator may also consult indications of positions allowing compatibility via the terminal, these indications relating to the compatible positions are also in the memory. In particular, the operating system may indicate to the operator the specific angular positions which allow adequate assembling. The angular ranges will for example be communicated by the operating system, or the local memory, relative to the frame of reference of the angular reference $M_{OT1mobile}$ of this tube $T_{1mobile}$, according to an orientation convention. FIG. 8 is a way of representing the adequate angular ranges, which may be provided by the electronic terminal.

The operator may, for example, apply a visual marking to the surface of the mobile tube $T_{1mobile}$ in order to locate these ranges which may be placed opposite the angular reference $M_{OT1fixed}$ of the tube $T_{fixed}$. According to one embodiment of the invention, the method comprises a step of marking the allowable zones, represented by Za in FIG. 2, on the mobile tube to be sent to the welding step 108; these zones are indicated on the tube itself and are identified on the basis of the reference $M_O$ of the mobile tube. In order to facilitate this marking, the terminal may convert the allowable angular zones by indicating distances in mm of the borders of these zones relative to the angular reference $M_{OTmobile}$. Next, with the aid of flexible magnetic rulers placed on the outside of the tube, the operator may precisely apply the limits and the location of the angular arc of the allowable zone Za. As an alternative or in addition, the electronic terminal may be arranged in a support inside the mobile tube and comprise a display for proposing the representation of FIG. 8 thereon. The terminal may then be configured to allow an operator to modify the place of the reference $M_O$ of the mobile tube on the display and to obtain a new display updating the clock position of FIG. 8 and thus allowing homothetic location of the allowable zones by eye.

Similarly, it is possible to mark on the tube $T_{1mobile}$ the only alignment configurations in which this tube will be in an angular position incompatible with the tube $T_{fixed}$. The choice of the markings may be made according to a strategy for minimizing the marking to be carried out.

On the other hand, if the first tube $T_{1mobile}$ is incompatible, the operator will send it to quarantine. The operator will repeat the steps above with the second mobile tube $T_{2mobile}$ of their stock.

If the second tube $T_{2mobile}$ is compatible, it will therefore be welded to the tube $T_{fixed}$. The method according to the invention will be repeated, but this time while considering the tube newly added, namely tube $T_{2mobile}$, as being the new fixed tube $T_{fixed}$. By reading the data of the end to be welded of the new tube $T_{fixed}$, the operating system will first propose for the operator to use the quarantined tube or tubes if one of these had a full or at least partial compatibility with the new end to be welded.

The benefit of the method according to the invention is that it minimizes the number of tubes remaining in quarantine.

The benefit of the invention is that it allows optimization of the management of the stocks of tubes to be welded. The invention also makes it possible to limit the steps of seeking better angular presentation of the ends of the tubes with respect to one another even before they are at the entry of the welding line 108.

FIG. 9A represents a HiLo value evaluated during the welding step 108. Specifically, the edges 11, or transverse face 11, of each tube of FIG. 5A are machined so that a chamfer 13 has been produced on one of these transverse faces 11. The machining of a chamfer 13 forms part of one of the steps of the welding operations 108. Chamfers 13 of which the internal radii are aligned may be seen in FIG. 5A, which is an optimal position with a view to welding.

FIG. 9B represents a case similar to FIG. 9A, representing two tubes $T_1$, $T_2$ for which a nonzero HiLo value 12 is observed between the two chamfers 13. This HiLo value 12 is represented here by the difference between the internal radii of the two tubes T1 and T2. This HiLo 12 value between chamfers 13 may be allowable if it is less than a predefined threshold. Since FIG. 5B is schematic, the HiLo value 12 between the chamfers may also be considered unsatisfactory.

Because the machining of these chamfers 13 is a high-precision step carried out during the welding step 108, it is important not to have to repeat this machining. The benefit of the invention is that it makes it possible to anticipate the compatibilities and to proceed so that the ends oppositely presented in the welding line are compatible with a very high probability, albeit not with a total guarantee. The machining operations carried out will then have a high probability of mutual compatibility.

An additional optimization permitted by the invention consists in distributing the tubes of a group into subgroups of tubes in order to minimize the cases of quarantine or total incompatibility within a given subgroup.

According to one particular embodiment of the invention, the processing step 106 may also give indications of distributions of the tubes of the group in question according to a plurality of subgroups, in order to minimize the assembling incompatibilities between the tubes of a given subgroup. The subgroups may be separated from one another on the storage facility 107. For this purpose, the method of the invention may be applied to a group of tubes in order to optimize their distribution within various groups intended to be treated separately. A transport operation 105 may again be necessary in order to form these groups of tubes and store them separately on their storage facility 107. The groups generated in this way make it possible to reduce the joining incompatibilities between tubes. Furthermore, the subgroups distributed in this way make it possible to reduce the quarantining of the tubes when these tubes are brought to the welding step 108.

During step 106, the method according to the invention makes it possible to generate an overall compatibility score $H_k$ specific to each of the possible pairs of ends of tubes within the group of tubes which is being considered.

FIG. 10 is a representation of the scores obtained in terms of compatibility index minimum minIND$_{thetak}$ on the ordinate and compatibility index maximum maxIND$_{thetak}$ on the abscissa for each of the possible pairs within a group of tubes $C_1$ designates a compatibility class grouping together the pairings which are compatible irrespective of the rotation $\Theta$, theta, carried out between the two given ends of said pairing, since the pairs identified in the group C1 have their compatibility index minimum minIND$_{thetak}$ and maximum maxIND$_{thetak}$ below the threshold H$_{limit}$.

$C_2$ designates a compatibility class grouping together the pairings which are compatible on condition of angularly presenting them correctly facing one another; a rotation will probably be necessary at the time when they are jointed. This is because the pairs of the group C2 do have their compatibility index minimum minIND$_{thetak}$ always less than the threshold H$_{limit}$, but for certain angular deviations $\Theta$, theta, the compatibility index maximum maxIND$_{thetak}$ will be greater than the threshold, $C_3$ designates a compatibility class grouping together the pairings which are not compatible irrespective of the rotation carried out. This is because these pairs have no compatibility index IND$_{thetak}$ below the limit threshold whatever the value of $\Theta$, theta.

FIG. 10 represents the distribution density of the pairings of tubes 1 in each of the classes $C_1$, $C_2$ and $C_3$.

A given end of the tube may enter any one of these 3 categories, depending on the pairs which it can be made to form with the other ends of tubes.

In a group of 100 tubes, the compatibility statistic of each end % Tn is therefore constructed with the 198 overall compatibility scores $H_k$ obtained by studying this end relative to the ends of the remaining 99 tubes of the group. The benefit of the invention is that it defines a compatibility statistic % Tn for each end relative to all the tubes of its group before the start of the welding step 108. By way of example, the end A of the tube $T_1$ may have as a statistic of compatibility % T1A with the other ends of the other tubes available in the group: $\{C_1, a \%; C_2, b \%; C_3, c \%\}$ such that a+b+c=100%.

FIG. 11 represents a table giving the compatibility statistics % Tn indicating the proportions C1, C2 and C3 of each tube end.

Alternatively, the table may be simplified to list, for each tube Tn, only the end of this tube Tn having the compatibility statistic having the greatest degree of incompatibility.

For example, for a tube T1 which has its ends A and B, if
% T1A is $\{C_1, 52\%; C_2, 33\%; C_3, 15\%\}$
% T1B is $\{C_1, 27\%; C_2, 70\%; C_3, 13\%\}$
then the table of FIG. 11 will indicate
% T1 is $\{C_1, 52\%; C_2, 33\%; C_3, 15\%\}$ According to another embodiment of the table of FIG. 11, since for each pair of tubes, each tube having two ends, there are 4 ways of associating the two tubes x and y with one another, this pair TxTy will be assigned a low compatibility score $N_{TxTy}$ corresponding to the lowest of the 4 scores Hk observed for each of the 4 possibilities of assembling the ends A and B respectively of each of the tubes x and y. The incompatibility score "nc" is lower than the partial compatibility score "cc", which is itself lower than the compatibility score "c". For example if $H_{TxATyA}$=c; $H_{TxATyB}$=c $H_{TxBTyA}$=cc and $H_{TxBTyB}$=nc. Then the pair $T_xT_y$ will have a low compatibility score $N_{TxTy}$ equal to "nc".

According to this other embodiment of the invention, for example in a group of 100 tubes, for each tube Tn there will be 99 low compatibility scores N. In the same way as in FIG. 11, the rate of proportions C1, C2 and C3 of each tube may be identified, and on the basis of its low compatibility scores a low-compatibility statistic % Ntn will then be obtained for each tube Tn: {$C_1$, e %; $C_2$, f %; $C_3$, g %} such that e+f+g=100%.

This table of FIG. 11 makes it possible to identify the tubes of which the compatibility statistic % Tn, and/or of which the low-compatibility statistic % Ntn has a value in its component C3 beyond a critical compatibility threshold, for example 60%, or more demandingly more than 50%, and even more demandingly more than 40%. The tubes not identified formed the group G0 of the tubes which are compatible overall.

For example, if in a group of 100 tubes, a number "d" of tubes has a component C3 of its compatibility statistic % Tn or of the low-compatibility statistic % Ntn beyond a critical compatibility threshold, the group G0 will have 100-d tubes. The "d" tubes will be isolated.

The "d" tubes may be denied introduction into the welding line 108 and earmarked for tests or trials in parallel with the welding line 108.

Alternatively, by using a fully connected graphs algorithm, in particular available under MATLAB or other mathematical programming software, and by determining a division size of the group, for example division into two groups, the algorithm will be launched so that it identifies among these "d" tubes those which will be in a first subgroup G1 and those which will be in a second subgroup G2.

Next, two batches will be made because division into 2 has been selected, with half the tubes of the group G0 and the tubes of the subgroup G1 in the first batch, and the other half of the tubes of the group G0 and the tubes of the subgroup G2 in the second batch.

This division into two batches will make it possible to limit the risks of incompatibility between tubes and the quarantine delays, and the invention makes it possible to distribute the tubes having a high probability of incompatibility, reflected by the C3 component in their statistic % Tn or % NTn, into each of the batches. The batches will be introduced one after the other into the production and welding line 108. This operation makes it possible to optimize the treatment times for assembling the tubes with one another.

According to one embodiment, the method of the invention makes it possible to generate a compatibility marking $M_C$, FIG. 2, of a tube. Such a marking may, according to one embodiment, be a colorimetric marking $M_C$. According to one embodiment, the compatibility marking $M_C$ of a tube is calculated 101 from its statistical distribution in the classes $C_1$, $C_2$ or $C_3$. Thus, a user is capable of recognizing on site tubes which may have a maximum cooperation statistic. Thus, according to one embodiment, the class $C_1$ is associated with a green-colored spot affixed on the surface of a tube having a statistic relating to this class greater than a predefined threshold. Likewise, a tube may comprise an orange-colored spot when its statistic relating to belonging to this class $C_2$ is greater than another threshold, and finally a tube may comprise a red spot when its statistic of belonging to the class $C_3$ is greater than a third threshold.

In one particular case, only the "d" isolated tubes will be marked in red.

According to one alternative, a spot having a complex colorimetric indication may represent the statistic of a tube belonging to each class.

The invention claimed is:

1. A method for generating an index of compatibility between two ends of two tubes, in particular before welding operations, said method comprising the steps of:
   (a) marking an angular reference on each of the two ends;
   (b) orbitally measuring a characteristic relating to a profile of each of the ends;
   (c) determining an index of angular compatibility between the two ends for an angular deviation between the angular references of said ends, this angular compatibility index being derived from a difference maximum between the orbital measurements, this maximum being searched for facing places of the profile,
   (d) iterating the determination of the angular compatibility index for a plurality of values of angular deviation between the angular references of said ends;
   (e) generating an overall score of compatibility between these two ends, the overall compatibility score being a function of the angular compatibility indexes determined for a plurality of angular deviation values.

2. The method for generating a compatibility index as claimed in claim 1, wherein the orbital measurement of a characteristic relating to the profile is a radius measurement.

3. The method for generating a compatibility index as claimed in claim 2, wherein the orbital measurement is a radius measurement, determined relative to a virtual center, for which radius differences are minimal.

4. The method for generating a compatibility index as claimed in claim 2, wherein the radius measurement is an internal radius measurement, and in that a virtual center is determined as a function of the internal radii.

5. The method for generating a compatibility index as claimed in claim 1, wherein the radius measurement is an external radius measurement.

6. The method for generating a compatibility index as claimed in claim 5, wherein the orbital measurement is an external radius measurement, determined relative to a virtual center, for which differences between internal radii are minimal.

7. The method for generating a compatibility index as claimed in claim 1, wherein the orbital measurement is carried out according to the same clock convention relative to the angular reference, so that for a given angular deviation between the angular references of the two tubes, for each measurement angle, the difference calculation between the value of the orbital measurement at this measurement angle on a first tube and the value of the orbital measurement observed on the second tube at an angle which is the inverse of this measurement angle is iterated, this inverse angle corresponding to 360° minus the value of the measurement angle, so that after these iterations, the iteration for which the difference of orbital measurements of the two facing ends is maximal as well as the value of this maximum difference corresponding to the difference maximum between the orbital measurements for this angular deviation are identified.

8. The method for generating a compatibility index as claimed in claim 1, wherein step (d) is carried out for angular deviation values increasing successively by a step of less than 5°, and preferably with a step of 1°, between each angular deviation.

9. The method for generating a compatibility index as claimed in claim 1, wherein the overall score of compatibility between the two ends takes a discrete score among:

compatible, or;

compatible on condition of controlled angular presentation, or alternatively;

incompatible.

10. The method for generating a compatibility index as claimed in claim 9, wherein the overall compatibility score depends on a HiLo threshold defined as a maximum tolerance threshold for all the angular compatibility indexes between the two ends which are determined for each angular deviation.

11. The method for generating a compatibility index as claimed in claim 10, wherein the overall compatibility score depends on a threshold range angular size for which there is a continuous group of angular deviation values in which the angular compatibility indexes are less than the HiLo threshold.

12. The method for generating a compatibility index as claimed in claim 11, wherein when the overall score of compatibility between two ends takes the discrete score "compatible", all the angular compatibility indexes measured for each of the angular deviations are less than the HiLo threshold, and in that when the overall score of compatibility between two ends takes the discrete score "compatible on condition of controlled angular presentation", there is at least one range of which the angular size is greater than the threshold range.

13. The method as claimed in claim 12, wherein when the overall score of compatibility between two ends takes the discrete score "compatible on condition of controlled angular presentation", the method comprises a step (f) of marking an allowable zone on one of the two ends in order to angularly locate, relative to the angular marking, a range of which the angular size is greater than the threshold range and in which there is a continuous group of angular deviation values in which the angular compatibility indexes are less than the HiLo threshold.

14. The method as claimed in claim 11, wherein a continuous group is a group of values of angular deviations considered successively in step (d).

15. A method for generating a compatibility statistic in a group of n tubes for which an overall compatibility score has been determined as per the method claim 1 for each of the possible pairs of ends of the group of tubes, such that the following are defined for each end:

its proportion of compatibility "C1" with all the ends of the other tubes, its proportion of partial compatibility "C2" with all the ends of the other tubes on condition of a controlled angular presentation between the ends, and its proportion of incompatibility "C3" with all the ends of the other tubes, these three proportions making up 100%.

16. The method for generating a compatibility statistic as claimed in claim 15, wherein each tube has as a compatibility statistic the proportions obtained by one of its two ends having the greater proportion of incompatibility.

17. A computer program product having a calculator and a memory for carrying out the steps of the method for generating the compatibility index and carrying out the steps of the method for generating a compatibility statistic as claimed in claim 16.

18. A method for dividing a group of n tubes, wherein the tubes are distributed into at least two batches as a function of the compatibility statistics of each of the tubes which are determined as per the method of claim 15, such that each batch comprises an equivalent number of tubes having a proportion of incompatibility C3 less than a compatibility threshold.

19. The method for dividing n tubes as claimed in claim 18, wherein it comprises a step of marking the tubes, during which a compatibility marking is written on at least certain tubes, the marking makes it possible to identify the tubes having a proportion of incompatibility C3 greater than said compatibility threshold.

20. A tube having an angular marking at each of its distal ends, the angular marking making it possible to carry out the method for generating a compatibility index as claimed in claim 1.

21. An electronic terminal having an interface for reading an identifier of a tube, an interface for receiving orbital-measurement data of a characteristic relating to the profile of an end of this tube; a calculator for transforming the orbital measurements as a function of a virtual center of said end, said calculator being configured to generate an overall score of compatibility of a pairing of tubes on the basis of the method of claim 1.

22. An assembly composed of an electronic terminal having an interface for reading an identifier of a tube, an interface for receiving orbital-measurement data of a characteristic relating to the profile of an end of this tube; a calculator for transforming the orbital measurements as a function of a virtual center of said end, said calculator being configured to generate an overall score of compatibility of a pairing of tubes and a group of n tubes, each having an angular marking at each of their distal ends, each distal end of each tube having $2*(n-1)$ overall scores of compatibility with each of the distal ends of the other tubes of the group, these overall compatibility scores being obtained by carrying out the method as claimed in claim 1, the overall scores of compatibility of each of the tube ends with the ends of other tubes of the group being stored in the electronic terminal.

23. The assembly as claimed in claim 22 wherein the angular location, relative to the angular marking, of a range of which the angular size is greater than a threshold range, and in which there is a continuous group of angular deviation values in which the angular compatibility indexes are less than a HiLo threshold, is stored in the electronic terminal for each of the $2*n*(n-1)$ possible combinations between these n tubes, wherein when the overall score of compatibility between two ends takes a discrete score "compatible on condition of controlled angular presentation", the method comprises a step (f) of marking an allowable zone on one of the two ends in order to angularly locate, relative to the angular marking, a range of which the angular size is greater than the threshold range and in which there is a continuous group of angular deviation values in which the angular compatibility indexes are less than the HiLo threshold, and wherein the overall compatibility score depends on a HiLo threshold defined as a maximum tolerance threshold for all the angular compatibility indexes between the two ends which are determined for each angular deviation.

\* \* \* \* \*

UNITED STATES PATENT AND TRADEMARK OFFICE
CERTIFICATE OF CORRECTION

PATENT NO. : 11,644,307 B2
APPLICATION NO. : 17/612095
DATED : May 9, 2023
INVENTOR(S) : Gotusso et al.

It is certified that error appears in the above-identified patent and that said Letters Patent is hereby corrected as shown below:

On the Title Page

Column 2, Item (57), under "ABSTRACT", Line 4, delete "(M0)" and insert -- $(M_0)$ --, therefor.

In the Specification

In Column 8, Line 46, delete "$M_{T10A}$" and insert -- $M_{0T1A}$ --, therefor.

In Column 10, Line 32, delete "$T_n$," and insert -- $T_n$ --, therefor.

In Column 10, Line 35, delete "$T_n$," and insert -- $T_n$ --, therefor.

In Column 12, Line 3, delete "M0" and insert -- $M_0$ --, therefor.

In Column 17, Line 51, after "calculated", delete "101".

Signed and Sealed this
Ninth Day of January, 2024

Katherine Kelly Vidal
*Director of the United States Patent and Trademark Office*